United States Patent [19]

Sherwood

[11] Patent Number: 4,540,625
[45] Date of Patent: Sep. 10, 1985

[54] FLEXIBLE AIR PERMEABLE NON-WOVEN FABRIC FILTERS

[75] Inventor: Charles H. Sherwood, Upland, Calif.

[73] Assignee: Hughes Aircraft Company, El Segundo, Calif.

[21] Appl. No.: 569,432

[22] Filed: Jan. 9, 1984

[51] Int. Cl.³ .......................... D04H 1/40; D04H 1/72
[52] U.S. Cl. ............................................ 428/283; 2/2;
2/243 A; 55/524; 55/527; 55/528; 264/23;
264/233; 427/57; 428/244; 428/288; 428/297;
428/311.5; 428/317.7; 428/317.9; 428/323;
428/329; 428/331; 428/372; 428/408; 428/902
[58] Field of Search .......................... 55/524, 527, 528;
264/23, 233; 427/57; 428/283, 288, 297, 323,
311.5, 317.7, 317.9, 329, 331, 372, 408

[56] References Cited

U.S. PATENT DOCUMENTS

| | | | |
|---|---|---|---|
| 3,971,373 | 7/1976 | Braun | 428/328 |
| 4,127,624 | 11/1978 | Keller et al. | 264/23 |
| 4,296,166 | 10/1981 | Ogino | 428/281 |
| 4,396,663 | 8/1983 | Mitchell | 428/262 |
| 4,397,907 | 8/1983 | Rosser | 428/244 |
| 4,411,948 | 10/1983 | Ogino | 428/281 |
| 4,429,001 | 1/1984 | Kolpin | 428/913 |
| 4,433,024 | 2/1984 | Eian | 428/367 |

Primary Examiner—James C. Cannon
Attorney, Agent, or Firm—M. E. Lachman; A. W. Karambelas

[57] ABSTRACT

A flexible, air permeable composite highly effective as a highly absorbent fiber filter, suitable for high throughput, low pressure drop applications. The composites and filters use a non-woven fabric substrate, in conjunction with organic polymer fibers, such as polypropylene fibers, formed in-situ from a solvent solution of the polymer, with solid particles such as carbon particles interstitially positioned within the mass, and forming a unique microstructure by the interaction of the flexible non-woven fibers and the polymer fibers. A method of entrapping small sorptive particles within such filters is also provided.

23 Claims, 4 Drawing Figures

FLEXIBLE AIR PERMEABLE NON-WOVEN FABRIC FILTERS

The Government of the United States of America has rights in this invention pursuant to Contract No. DAAK 60-81-C-0006 awarded by the Department of the Army.

BACKGROUND OF THE INVENTION

1. Field of the Invention

This invention relates to the provision of air permeable composites for use in the fabrication of filters, and is particularly concerned with the provision of flexible, air permeable fabric formed of a flexible non-woven substrate, organic fibers and solid particles.

This invention provides novel composites, particularly useful in the preparation of fabric filters which are flexible and highly absorbent, and which are advantageous for high throughput and low pressure drop applications; and also provides a method of entrapping small sorptive particles.

2. Description of the Prior Art

Synthetic fibers, both woven and non-woven, are well known and have been used in countless applications for some period of time. Many of these fabrics may be characterized as composites in that they are comprised of two or more distinctively different materials that are bound together in some manner to provide a single material whose properties differ from that of either of its constituent elements. Typical applications for these fabrics or composites include, but are not limited to, the fabrication of protective clothing, filters, screens, protective shields, and numerous decorative items.

Of particular interest in this art is the use of fabrics and/or composites in the fabrication of filters or chemically absorptive cloth-like materials, such as articles of protective clothing for chemical environments.

U.S. Pat. No. 4,127,624 to Keller et al., assigned to the present assignee, discloses production of polymeric fibers and fiber masses from solutions of fiber-forming organic polymers, such as polypropylene, by simultaneously cooling and agitating the polymer solution while subjecting the solution to the application of sonic vibrations, followed by removing the solvent, leaving resultant fiber masses. Fiber bundles produced from masses of this type can be used to form a variety of articles, as for example, to form fabrics.

U.S. Pat. No. 3,971,373 discloses a porous sheet product comprising a web of entangled organic polymeric fibers, such as polypropylene, and an array of solid particles, such as activated carbon, uniformly dispersed and held in the web.

U.S. Pat. No. 4,397,907 to R. W. Rosser and L. B. Keller, assigned to the present assignee, discloses composites fabricated using solid sorptive particles, such as activated charcoal, positioned within a network of organic fibers such as polypropylene fibers. This patent further discloses a woven cloth substrate fiberized with polypropylene and activated charcoal.

However, there exists a requirement for the provision of composite materials, particularly useful as flexible, air permeable filters which permit absorption and entrapment of smaller particles and greater amounts of sorptive particles than current materials, such as those materials taught in the prior art noted above. There is also a need to provide such materials which also provide high flexibility and air permeability, and high sorptive particle, e.g. carbon particle, entrapment levels not available using woven substrate materials, as disclosed in the above-discussed U.S. Pat. No. 4,397,907.

Another area of important utility for composites of this nature is in air filters for filtering out foreign impurities, as for example, for use in various sealed vehicles, e.g. so-called "armored cars." Thus, in these vehicles, a very large filter is employed for drawing air in from the outside. An effective filter of substantially reduced size could be used for this purpose. Also, filters of this general type are needed for use in removing industrial toxins.

SUMMARY OF THE INVENTION

According to the present invention, there is provided a flexible permeable highly absorbent fiber filter particularly designed for high throughput and low pressure drop applications. This is achieved, particularly, by the use of a non-woven substrate in conjunction with in-situ formed organic polymer fibers, ISF as defined below, such as polypropylene fibers, with solid particles interstitially positioned between the non-woven fibers and the in-situ fibers.

More particularly, the non-woven substrate fibers are intermixed or combined with the in-situ fibers, and the solid sorptive particles, which are interstitially located within the mixture of fibers as noted below. This combination forms a highly absorbent fiber filter having high porosity and good structural strength and which is lightweight.

A particular feature of the present invention is the use of a non-woven substrate or non-woven fibers, which results in a highly functional and novel structure. The use of non-woven substrate fibers in the invention composite or fabric filter permits the entrapment of very small sorptive particles therein, e.g., of a size of five micrometers or less, and in greatly increased amounts compared to that which was previously achievable. The sorptive solid particles can comprise a major proportion of the weight of the composite. This results in very high sorptive capacity. In addition, the use of a non-woven substrate, i.e., non-woven fibers, in conjunction with the in-situ organic polymer fibers and the solid particles, results in increased air permeability and fabric flexibility, due to the formation of a different fiber microstructure. This different microstructure is believed to be a result of the interaction of the flexible non-woven fibers and the crystallizing polymer fibers.

Thus, the present invention employing non-woven fibers as contrasted to the prior art, such as the above noted U.S. Pat. No. 4,397,907, permits smaller sorptive particles and greater amounts of such sorptive particles to be entrapped, and the smaller particles demonstrate enhanced sorption performance. The filter of the present invention provides additional advantages over the composite of the above noted patent in that the non-woven fabric fibers of the present invention induce greater flexibility, together with high permeability and high carbon entrapment levels not possible with woven substrate materials. The filters of this invention are prepared by first providing a hot polymer solution of a fiber-forming polymer material and subsequently adding thereto the desired class of solid particles to form a suspension of solid particles in the polymer solution. A piece of non-woven fabric is added to the suspension. The temperature of the solution is lowered and agitation is applied. This action causes the polymer to form fibers from the solution, and hence such fibers are grown fibers or so-called "ISF" fibers produced by in-situ fiberization, and which intertwine or intermesh with the flexible non-woven fabric fibers and entrap the suspended solid particles within the fibrous mass.

The reason for enhanced properties of the composite or fabric filter of the invention using a non-woven substrate is believed to be the interaction of the crystallizing grown or ISF (in-situ) fibers and the flexible substrate. Flow patterns are created such that the in-situ fibers precipitated from solution function primarily to entrap the solid particles, e.g. carbon particles, with respect to non-woven fibers. The in-situ polymer fibers do not tend to form an interconnecting network throughout the substrate material, as in the above U.S. Pat. No. 4,397,907 but rather, tend to form a preferential fiberization in the region of the substrate. It is this interconnecting network which inhibits flexibility and permeability. Therefore, the fabric filter according to the present invention, formed of a mixture of non-woven fibers and in-situ polymer fibers, is flexible and permeable, while still possessing substantial sorptive capacity.

It is therefore one purpose of the present invention to provide an air permeable composite or filter which has high permeability and fabric flexibility. It is also possible to provide a flexible, air permeable filter, having high sorptive capacity. This air permeable filter may be tailored to have a substantially increased amount of sorptive particles. The highly flexible fabric filter of the above type has good structural strength even after being subjected to substantial bending, as contrasted to other fabric composites and filters.

With the above and other purposes in view, our invention resides in the novel features and compositions of the composites of the invention and of the arrangement of steps in the method of entrapping particles, as hereinafter described in more detail. Thus, these and other objects will become apparent from the following description of the invention as embodied in this specification and the accompanying claims.

BRIEF DESCRIPTION OF THE DRAWINGS

Figure 1:
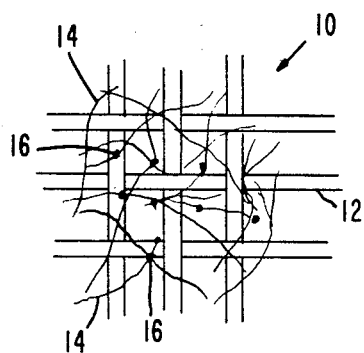
Figure 2:
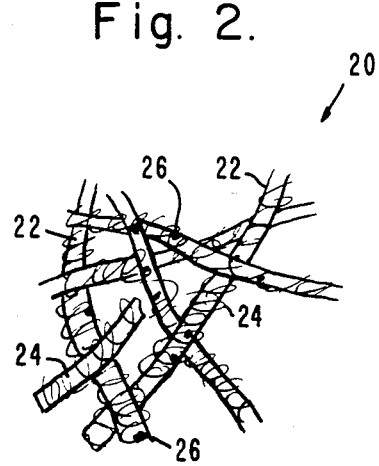
Figure 3:
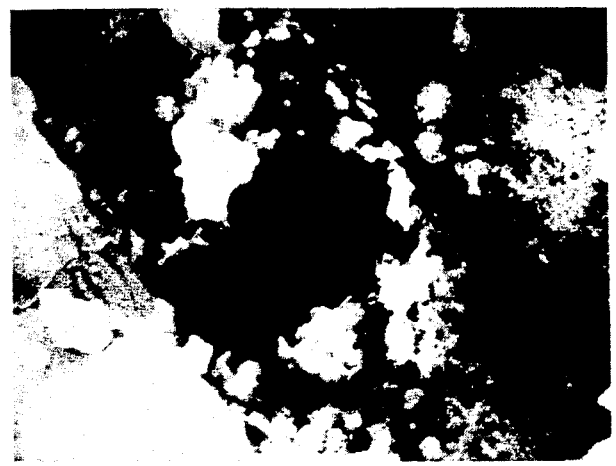
Figure 4:
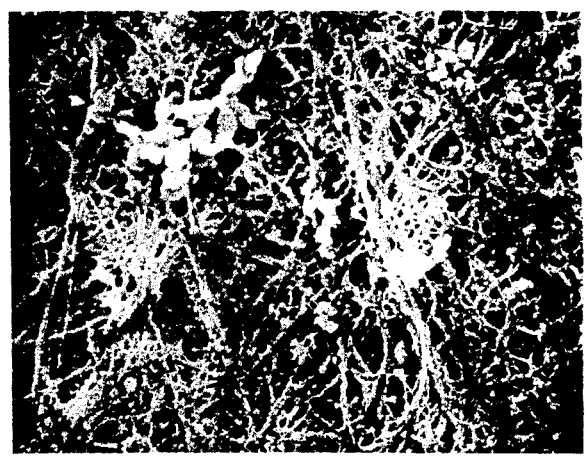

Having thus described the invention in general terms, reference will now be made to the accompanying drawings in which:

FIG. 1 is a schematic representation of a prior art woven substrate with in-situ fibers and sorptive particles combined therewith;

FIG. 2 is a schematic representation of a random non-woven substrate formed of substrate fibers and in-situ fibers and sorptive particles combined therewith;

FIG. 3 is an electron microscope photograph enlargement of a filter material of the invention, employing a non-woven fiber substrate as described in Table 1 hereinafter; and FIG. 4 is an electron microscope photograph enlargement of a prior art filter material employing a woven fiber showing carbon entrapment in air flow-through channels and the dense fiber network of the filter.

BRIEF DESCRIPTION OF THE INVENTION

Referring now in more detail by reference characters to the drawings, FIG. 1 represents a schematic illustration of a prior art composite as in U.S. Pat. No. 4,397,907, comprising a woven substrate fabric 10 having fibers 12 woven in a generally parallel array in a conventional fashion. When in-situ fibers 14 are formed in solution on the woven fiber substrate 10, the in-situ formed polymeric fibers 14 generally form a somewhat uniform network and extend across and are essentially uniformly distributed between the woven substrate fibers 12. Further, carbon particles or other sorptive particles 16 are entrapped either on the woven fibers 12 or otherwise in between the woven fibers 12 as shown. The sorptive particles 16 must essentially be entrapped in all degrees of movement so as to maintain them within the structure.

FIG. 2 illustrates a schematic representation of a composite in accordance with the present invention, comprising a non-woven substrate material 20 formed of randomly oriented and randomly dispersed fibers 22. In-situ formed polymeric fibers 24 are formed from solution and tend to agglomerate along and around each of the non-woven fibers 22. More specifically, there is little tendency for these in-situ fibers to extend between the various non-woven fibers 22. This gives the composite great flexibility and allows for increased air permeability.

Still referring to FIG. 2, it can be observed that carbon particles or other sorptive particles 26 are essentially deposited on the non-woven fibers and are thus captured against such non-woven fibers and between the in-situ fibers 24 and the non-woven fibers 22. There does not appear to be any significant carbon or other sorptive particle encapsulation in the regions between the various non-woven fibers 22.

The present invention can be employed in any filtering application requiring tailored air permeability and flexibility in conjunction with high sorptive capability. Since the composite of the present invention is formed by the combination of non-woven fibers and organic polymer grown or in-situ fibers, these composites can entrap very small solid sorptive particles. These small sorptive particles can comprise a large percentage of the final material weight, and this renders the filter of the invention attractive from the standpoint of having highly improved sorptive capacity. The filter material of the invention can be tailored with respect to air permeability and flexibility to fit numerous applications by properly selecting the type of non-woven fibers, solid particles and the organic fibers to be utilized.

Generally, to practice the invention, a polymer-solvent solution is prepared by dissolving an organic polymer such as polypropylene in a suitable solvent such as xylene at an elevated temperature, e.g. above 110 degrees C. Selected solid particles, preferably carbon particles, are then added to the solution and mixed to form a particle suspension in the polymer-solvent solution at the elevated temperature. A piece of non-woven fabric such as Kevlar felt is added to the suspension. Upon, or after cooling, e.g. to 95–105 degrees C., constant agitation causes polymeric fibers to form in-situ around the suspended solid particles, and precipitate from the solution. The non-woven fibers are intermixed with the precipitated in-situ polymer fibers containing the entrapped solid particles.

The composites of the invention are generally formed by precipitating the organic polymeric fibers from solutions containing the suspended particles, with agitation as described in the above identified U.S. Pat. No. 4,127,624, the teaching of which is incorporated herein by reference. For example, the organic in-situ fibers can be precipitated from super-cooled solutions. Also, the organic in-situ fibers can be formed by a simultaneous cooling in the formation process. Further, other forms of mechanical perturbations such as stirring may also be utilized; although the process described in U.S. Pat. No. 4,127,624 is preferred. Oscillatory agitation at frequencies in the range of 20-800 Hz are suitable, but frequencies in the range of 40-200 Hz appear to yield the best results.

Thus, the precipitated fibers are grown on the non-woven fibers from a fiber-forming solution of an organic polymer during controlled orientation and under proper conditions of temperature and agitation to provide the mixture of non-woven and in-situ fibers containing the captured sorptive solid particles as described above and illustrated in FIG. 2. The final product is a fibrous mixture of non-woven fibers and of intertwined polymer fibers and containing solid particles which are entrapped within the interstices of said mixture, but which are attached primarily to the non-woven fibers. The in-situ organic polymeric fibers are formed on and around the non-woven fibers in a random manner, as illustrated in FIG. 2, but essentially do not interconnect between the main fibers of the substrate. By contrast, in the prior art composites, as illustrated in FIG. 1, employing a woven fabric, the in-situ fibers connect between the woven fibers. Due to the fiber structure of the composite produced according to the present invention as illustrated in FIG. 2, a larger amount of solid particles, e.g. carbon particles, can be entrapped. Thus, the proportion of solid, e.g. carbon, particles can comprise a major proportion of the total weight of the fabric composite, e.g. about 60 to about 80 percent or more, of the total final fabric weight, as contrasted to the much smaller solid particle content of the prior art filters employing woven fiber materials. This is believed to be due to the fact that in the invention filter, small solid particles are entrapped essentially against the larger non-woven fibers, whereas the prior art fiber structure as illustrated in FIG. 1 seeks to entrap the solid particles in all directions, including the area between the woven fibers. A unique aspect of the filter of the present invention is its capability for absorbing small foreign particles, yet permitting air to pass readily through the filter. Thus, the filter structure of the invention has the proper combination of air permeability and solid particle absorption of high filter efficiency.

Non-woven substrate fiber materials which can be employed for producing the improved filters of the invention include preferably Kevlar (aromatic polyamide) felt. However, most commercially available non-woven fiber materials can be utilized, including the synthetic fibers such as glass fibers, nylon fibers, such as the fibers marketed as "Nomex," and rayon fibers, as well as the natural fibers such as cellulose fibers, hemp, and the like. It should be understood that the non-woven material would be selected so that it would not be softened, or dissolved, or disintegrated by the filter-forming polymer solution or reaction conditions. The use of a non-woven fiber material in the filter of the invention results in an increased air permeability and fabric flexibility because of the nature in which the flexible non-woven fibers and the polymer grown or ISF fibers are combined and the other advantages set forth above.

The solid particles which are employed, are those which are not soluble in or reactive with the selected solvent, and are of a size or density to enable them to be maintained in a uniform suspension during the organic fiber formation process. Various chemically absorptive porous particles, such as carbon particles, activated charcoal, activated alumina, fuller's earth, diatomaceous earth and silica gel can be used, for example, with polypropylene or other aliphatic crystalline polymers. Preferred absorption particles are carbon particles. Such sorptive particles, particularly carbon particles, can be employed in the form of very small particles, preferably not larger than 5 $\mu m$, and ranging from about 2 to 5 $\mu m$. In fabricating the filters of the invention, such small particles can be employed in greatly increased amounts compared to that previously achievable, resulting in very high sorptive capacity. About 0.5 to about 3% by weight, of the solid particles are dispersed in the polymer-solvent solution.

It is also possible to utilize more than one type of solid particle to obtain a fabric exhibiting a desired combination of functional characteristics. For example, a coloring agent may be utilized with carbon particles to impart color to the fabric, and calcium phosphate or other flame resistant component may be utilized with carbon to provide a chemically absorptive fabric that is also flame-resistant. It should be understood that such agents would also be selected so that they would not be adversely affected by the fiber-forming polymer solution or reaction conditions.

Polymers which are highly suitable for the production of polymer fibers of this invention are the linear, crystalline polyalkenes such as polyethylene, polypropylene, polybutene, poly(4-methyl-1-pentene) and so forth. Also, polymers such as polyvinylidine fluoride and polychlorotrifluoroethylene may be used. Modified versions of the aforementioned polymers may also be used, such as propyleneacrylic acid copolymers. Fiber masses may also be formed from many other polymers, such as, for example, nylon, polystyrene, polyethylene oxide, polyacrylonitrile, acrylonitrile-butadiene-styrene terpolymers, and tetrafluoroethylene-hexafluoropropylene-vinylidene terpolymers when precipitated in a fiber mass in combination with a suitable seeding polymer, typically selected from the linear, crystalline polyalkenes. Various mixtures of the above polymers can also be employed. The amount of polymer employed in the polymer-solvent solution can range from about 1% to about 5% by weight.

A primary processing solvent whose boiling point is moderately high, such as mixed xylenes, styrene, divinylbenzene, decalin, etc., should be selected for compatibility with the polymer selected to form the fibrous mass.

After precipitation of the fibers from the polymer solvent solution, the reaction mixture is cooled to ambient temperature, and the primary solvent is removed from the precipitated fibrous mass by extracting in fresh solvent such as xylene. The fibrous mass is then washed in a low boiling solvent such as pentane, methanol, ethanol, acetone or toluene, followed by a drying step.

EXAMPLES

The following are examples of practice of the invention and the invention may therefore be illustrated by, but not limited to, the following Examples.

EXAMPLE 1

To a 5% by weight solution of isotactic polypropylene in hot xylenes was added 1% by weight of carbon particles (2-5 $\mu m$). A piece of non-woven Kevlar felt was immersed in the hot solution, and the solution was then cooled to 105 degrees C. and the Kevlar felt was agitated at frequencies ranging from 40 to 200 Hz.

A fibrous mass was formed, and the resulting fibrous mass was cooled, extracted with fresh xylene, washed with ethanol and dried. This mass was in the form of non-woven felt fibers intermixed with grown or in-situ formed polypropylene fibers and containing entrapped carbon particles. As further discussed in Example 3, electron microscope examination of this mass revealed that the non-woven fibers are randomly oriented in the fibrous mass and the in-situ fibers are agglomerated along the non-woven fibers, with relatively few in-situ fibers extending between the non-woven fibers. The carbon particles are essentially captured against the larger non-woven fibers and between the latter fibers and the agglomerated in-situ fibers.

EXAMPLE 2

The procedure of Example 1 was essentially followed but employing in place of the Kevlar felt substrate, in one instance a glass weave substrate, and in another instance a Kevlar weave substrate. In both cases, as further discussed in Example 3, electron microscope examination showed that a fibrous mass of mixed woven substrate fibers and polypropylene in-situ fibers and entrapped carbon particles was formed, comprised of a substantially uniform network of in-situ grown fibers extending across and between the woven fibers, with carbon particles entrapped on the woven fibers and between the woven fibers.

EXAMPLE 3

The composite or filter material of the invention produced according to Example 1 employing Kevlar felt, and the fabric composites produced employing a glass weave substrate and a Kevlar weave substrate in Example 2 had the fiberized fabric weights and compositions noted in Table I below, for items C, A, and B, respectively.

TABLE I

| FILTER COMPOSITION | WEIGHT (mg/cm$^2$) | PROPORTION OF FINAL FABRIC WEIGHT (%) |
|---|---|---|
| A. GLASS WEAVE SUBSTRATE | | |
| Substrate Material | 30 | 34 |
| Polypropylene Fibers | 10 | 11 |
| Carbon Particles | 48 | 55 |
| B. KEVLAR WEAVE SUBSTRATE | | |
| Substrate Material | 17 | 30 |
| Polypropylene Fibers | 7 | 12 |
| Carbon Particles | 33 | 58 |
| C. KEVLAR FELT | | |
| Substrate Material | 6 | 5 |
| Polypropylene Fibers | 24 | 19 |
| Carbon Particles | 95 | 76 |

As set forth in Table I, the mg. per cm$^2$ refers to the area of the final product. As seen from Table I above, the composite or fabric filter of the invention set forth in item C of Table I has entrapped a substantially greater amount of carbon particles (76%) as compared to the amount of carbon particles entrapped in the fabric composites set forth in items A and B, each employing a woven substrate (55% and 58%, respectively).

Carbon tetrachloride absorption tests were performed on samples A, B and C of Example 3 above. The specimens were baked under vacuum to remove any residual solvent left over from processing, and then placed in open weighing dishes. These specimens were weighed and then placed in closed desiccators containing liquid CCl$_4$; the samples were suspended above the fluid and not submerged in it. After 24 hours the dishes were removed from the desiccators and reweighed to determine the amount of gaseous CCl$_4$ absorbed by the specimens. The results are shown in Table II.

TABLE II

| | mg CCl$_4$/cm$^2$ on cloth |
|---|---|
| A. GLASS WEAVE SUBSTRATE | 20 |
| B. KEVLAR WEAVE SUBSTRATE | 15 |
| C. KEVLAR FELT SUBSTRATE | 45 |

As seen from Table II above, the microstructure of the fabric filter of the present invention has substantially higher absorptive capacity, as illustrated by fabric composite C employing a felt substrate, as compared to the sorptive capacity of the composites A and B, each formed employing a woven substrate. The higher sorptive capacity of the filter composite of the present invention as illustrated in Table II above means that more sorptive particles are available along air flow-through channels. This latter point is illustrated in FIGS. 3 and 4 which are electron microscope photographs of, respectively, filter material C of Table I produced in Example 1 using the non-woven substrate of the invention, and filter material B of Table I produced in Example 2 using woven substrates, showing carbon entrapment and air flow-through channels for the invention filter C (FIG. 3) as contrasted to carbon treatment and the dense fiber network for the fabric composite B (FIG. 4) employing a woven substrate.

EXAMPLE 4

Six specimens of non-woven Kevlar felt were added to a hot xylene solution containing 1% by weight polypropylene and 1% by weight suspended carbon particles (2–5 $\mu$m). The solution was cooled to 105 degrees C. and the felt was agitated at a frequency of the order of 50 Hz.

Twelve additional samples of non-woven Kevlar felt were added to a hot xylene solution containing 1.5% by weight polypropylene and 1% by weight suspended carbon particles, the solution was cooled and agitated as noted above.

In each case described above the fibrous mass formed was cooled, extracted with fresh xylene, washed with acetone and dried.

The resulting fibrous mass in each case was in the form of in-situ grown polypropylene fibers formed around the non-woven Kevlar fibers, but not extensively between them. All of the sample fiber masses so formed had good flexibility, high air permeability and greater than 60% by weight of entrapped carbon particles.

Finally, the use of a non-woven substrate according to the present invention results in a flexible filter product which will resist damage after being subjected to substantial continued bending, such as a 180 degree bend. On the other hand, the use of woven substrates or no substrate at all results in a semi-rigid fabric which is readily damaged by continued flexing.

The fabric composite of the present invention employing non-woven substrate fabric exhibits enhanced filtering characteristics rendering such composites suitable for use in the fabrication, for example, of protective clothing, such as chemical warfare garments, and as a filter in gas masks, and also for use in filters in the chemical industry for removal of industrial toxins and in relatively large filters for use in military equipment such as tanks.

Thus, there has been described a unique and novel flexible air permeable composite using flexible non-woven fibers and in-situ formed organic polymer fibers and interstitially located solid sorptive particles, and which thereby fulfills all of the objects and advantages sought therefore. It should be understood that many changes, modifications, variations and other uses and applications will become apparent to those skilled in the art after considering this specification and the accompanying drawings. Therefore, any and all such changes, modifications, variations and other uses and applications which may become apparent to those skilled in the art after considering this specification are deemed to be covered by the present invention.

What is claimed is:

1. A tailorable air permeable flexible composite for use in the fabrication of filters, comprising a fiber mass formed of a randomly oriented mixture of flexible non-woven substrate fibers, and in-situ formed organic polymer fibers intertwined with said non-woven fibers and containing solid sorptive microscopic particles essentially captured against said non-woven fibers, to form a flexible, air permeable, highly absorbent fiber filter.

2. The composite of claim 1, wherein said solid particles comprise a major proportion of the weight of said composite.

3. The composite of claim 1, wherein said particles comprise about 60 to about 80% of the total weight of said composite.

4. The composite of claim 1, said flexible non-woven fibers interacting with said polymer fibers, and said polymer fibers functioning to attach said solid particles to said non-woven fibers.

5. The composite of claim 1, said organic polymer fibers being linear crystalline polyalkenes.

6. The composite of claim 1, wherein said solid particles are porous absorptive particles selected from the group consisting of carbon particles, silica gel, activated alumina, diatomaceous earth, and fuller's earth.

7. The composite of claim 1, wherein said solid sorptive particles are carbon particles.

8. The composite of claim 1, wherein said organic polymer fibers are polypropylene fibers.

9. The composite of claim 1, wherein said solid sorptive particles are carbon particles and said organic polymer fibers are polypropylene fibers.

10. The composite of claim 1, wherein said non-woven substrate fibers are aromatic polyamide fibers.

11. The composite of claim 1, wherein said solid sorptive particles are carbon particles, said non-woven fibers are aromatic polyamide fibers, and said organic polymer fibers are polypropylene fibers.

12. The flexible composite of claim 1 wherein said solid sorptive particles are of a size ranging from about 2 to about 5 micrometers.

13. The composite of claim 1, wherein said organic polymer fibers are selected from the group of polyethylene, polypropylene, polybutene, poly(4-methyl-1-pentene), polyvinylidene fluoride, polychlorotrifluoroethylene, nylon, polystyrene, polyethylene oxide, propyleneacrylic acid copolymers, polyacrylonitrile, acrylonitrile-butadiene-styrene terpolymers, and tetrafluoroethylene-hexafluoropropylene-vinylidene terpolymers, and mixtures of the above.

14. A tailorable air permeable, flexible composite for use in the fabrication of filters, comprising a fiber mass formed of a randomly oriented mixture of flexible non-woven substrate aromatic polyamide fibers and in-situ formed crystalline polypropylene fibers formed around said non-woven fibers, with a relatively small amount of said in-situ fibers extending between said non-woven fibers, and containing carbon particles of a size within the range of about 2 to 5 micrometers, said carbon particles comprising a major proportion of the weight of said composite, and said carbon particles essentially captured against said non-woven fibers and between said in-situ fibers and said non-woven fibers, to form a flexible, air permeable, highly absorbent fiber filter.

15. The composite of claim 14, said polyamide fibers interacting with said polypropylene fibers, and said polypropylene fibers functioning to attach said carbon particles to said non-woven polyamide fibers.

16. A method of entrapping small sorptive particles within a fiber mass which comprises precipitating organic polymer fibers from an organic solvent solution of (1) a fiber-forming organic polymer and containing (2) suspended small sorptive solid particles and (3) flexible non-woven substrate fibers, and forming a fiber mass comprised of a mixture of flexible, non-woven substrate fibers and organic polymer fibers intertwined with each other and containing small solid sorptive particles interstitially positioned within said mass, to form a flexible, air permeable, highly absorbent fiber filter.

17. The method of claim 16, wherein said solid particles comprise a major proportion of the weight of said composite.

18. The method of claim 16, wherein said flexible non-woven fibers interact with the polymer fibers and the polymer fibers attach said solid particles to said non-woven fibers.

19. A method of entrapping small sorptive particles and producing a tailorable air permeable flexible composite which comprises:

(a) introducing into a hot organic solvent solution of a fiber-forming organic polymer containing suspended small sorptive solid particles, flexible non-woven substrate fibers;

(b) subjecting said solution to agitation and cooling to a temperature which causes precipitation of fibers of said organic polymer from said solution, said organic fibers forming in-situ around the non-woven fibers of said substrate, and said solid particles captured against said non-woven fibers and between said in-situ formed fibers and said non-woven fibers;

(c) removing the resulting fibrous mass from said solution;

(d) washing said fibrous mass with fresh solvent; and (e) drying said fibrous mass.

20. The method of claim 19, said organic solvent solution containing about 1 to 5% by weight of dissolved organic polymer and about 0.5 to about 3% by weight of sorptive solid particles.

21. The method of claim 20, said organic solvent being xylene and said organic polymer being polypropylene, and wherein said solution is cooled to a temperature between about 95° C. and about 105° C. to cause said precipitation of said polypropylene fibers.

22. The method of claim 21, including extracting said fibrous mass with fresh xylene, and said washing said fibrous mass taking place with a solvent selected from the group consisting of pentane, methanol, ethanol, acetone and toluene.

23. The method of claim 22, wherein said flexible non-woven substrate fibers are aromatic polyamide fibers and said sorptive solid particles are carbon particles of a size ranging from about 2 to 5 micrometers.

* * * * *